(12) United States Patent
Randolph

(10) Patent No.: US 6,237,625 B1
(45) Date of Patent: May 29, 2001

(54) DUAL PLATE CHECK VALVE

(76) Inventor: Ronald E. Randolph, 2190 San Luis Rd., Walnut Creek, CA (US) 94596

( * ) Notice: Subject to any disclaimer, the term of this patent is extended or adjusted under 35 U.S.C. 154(b) by 0 days.

(21) Appl. No.: 09/511,412

(22) Filed: Feb. 23, 2000

(51) Int. Cl.[7] ................................................. F16K 15/00
(52) U.S. Cl. ...................................... 137/512.15; 137/527
(58) Field of Search ................................ 137/512.1, 527, 137/512.15

(56) References Cited

U.S. PATENT DOCUMENTS

| | | | |
|---|---|---|---|
| 1,087,981 | * 2/1914 | Reynolds | 137/512 |
| 2,292,003 | * 8/1942 | Yant et al. | 137/512 |
| 2,800,920 | * 7/1957 | Smith | 137/512 |
| 2,898,080 | * 8/1959 | Smith | 137/512 |
| 3,047,012 | * 7/1962 | Smith | 137/512 |
| 4,195,657 | * 4/1980 | Pysh | 137/512.15 X |
| 5,236,009 | * 8/1993 | Ackroyd | 137/527 |
| 5,301,709 | 4/1994 | Gasaway | 137/15 |
| 5,318,063 | * 6/1994 | Muddiman | 137/512.1 X |
| 5,392,810 | * 2/1995 | Cooper et al. | 137/512.1 |
| 5,405,382 | * 4/1995 | Kukolnikov et al. | 137/527 X |
| 5,551,483 | 9/1996 | Hochstrasser | 137/846 |
| 5,584,315 | * 12/1996 | Powell | 137/527 X |
| 5,709,240 | 1/1998 | Martin et al. | 137/527 |
| 5,711,343 | 1/1998 | Beckett | 137/512 |
| 5,713,389 | * 2/1998 | Wilson, Jr. et al. | 137/527 X |
| 5,794,655 | * 8/1998 | Funderburk et al. | 137/527 |
| 5,819,790 | 10/1998 | Cooper | 137/512 |
| 5,855,224 | 1/1999 | Lin | 137/527 |
| 6,098,656 | * 8/2000 | Farina | 137/527 X |

OTHER PUBLICATIONS

Facsimile dated Oct. 13, 1997, depicting a dual plate check valve, Technocheck Style 5002.
Undated brochure for US Valve Wafer Check Valves, depicting a dual plate check valve.

* cited by examiner

*Primary Examiner*—John Rivell
*Assistant Examiner*—Meredith Schoenfeld
(74) *Attorney, Agent, or Firm*—Finley & Berg, LLP

(57) ABSTRACT

An inventive dual plate check valve is provided which comprises a central anchoring fixture and an elastomer hinge fixed to the central anchoring fixture by a center post clamp. Two opposing sections of the elastomer hinge are formed on opposing sides of the center post clamp, and at least one disc member is attached to each opposing section of the elastomer hinge to form a valve plate which is pivotable about the center post clamp. In one embodiment, the central anchoring fixture forms projections on opposing sides of the center post clamp such that the lower edges of the valve plates are prevented from sliding off of the upper surface of the central anchoring fixture. In another embodiment, a stop pin is provided which extends vertically between the valve plates.

10 Claims, 4 Drawing Sheets

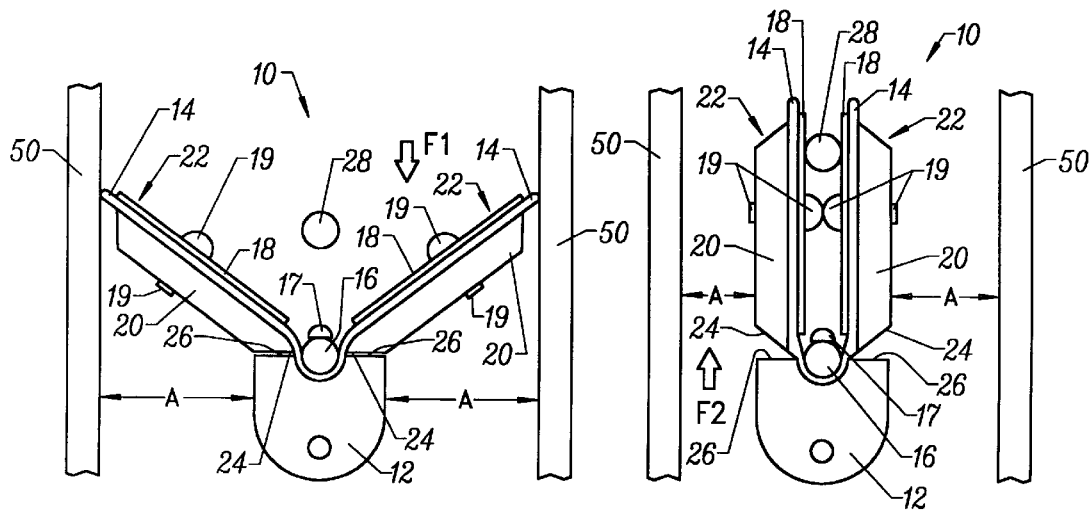
FIG. 1 (Prior Art)
FIG. 2 (Prior Art)
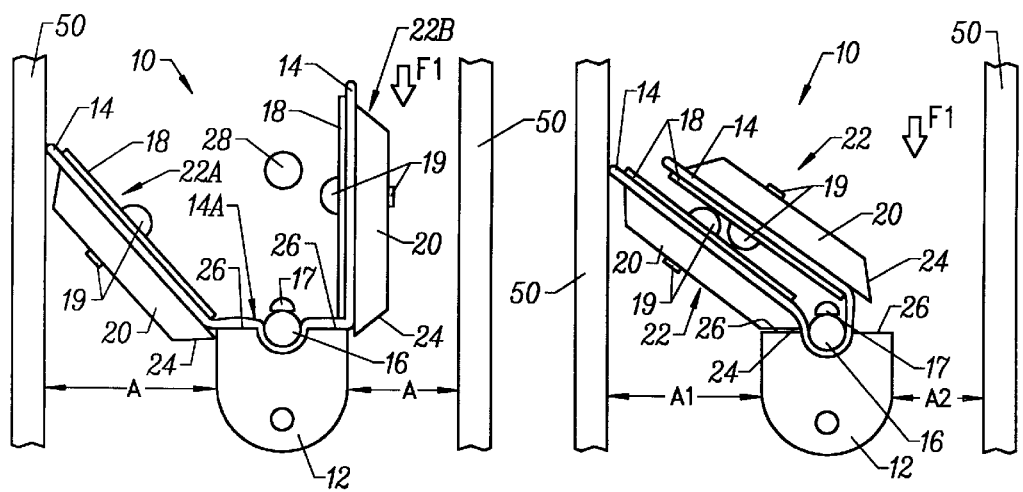
FIG. 3 (Prior Art)
FIG. 4 (Prior Art)

DUAL PLATE CHECK VALVE

FIELD OF THE INVENTION

This invention relates generally to fluid flow check valves and in particular to a dual plate check valve.

BACKGROUND OF THE INVENTION

Dual plate check valves are known which provide substantially one-way fluid flow through a fluid system. A dual plate check valve typically comprises an anchoring base upon which two D-shaped valve plates, sometimes referred to as wings, flaps, or wafers, are pivotally mounted. In use, the check valve is diametrically installed into a tube, or inside an annular housing fitted into a tube. Each valve plate pivots between an open position in which it substantially parallels the desired direction of fluid flow through the system, thereby allowing fluid to flow past the valve through an aperture formed between the base and the tube or annular housing, and a closed position in which it blocks fluid flow in the undesired direction by closing off the aperture.

The valve plates of the check valve are normally pivoted to the open position in response to fluid pressure from fluid flow in the desired direction through the system. For the check valve to prevent fluid flow in the undesired direction, the valve plates must pivot to the closed position in response to either cessation of fluid pressure from the desired direction or commencement of fluid pressure from the undesired direction.

In some dual plate check valves, mechanical means such as springs are used to bias the D-shaped plates into the closed position. For example, U.S. Pat. No. 5,819,790 to Cooper and U.S. Pat. No. 5,711,343 to Beckett describe check valves in which the valve plates are preferably spring-biased to the closed position. However, biasing is undesirable in some applications because additional fluid pressure is necessary to overcome the biasing to open the valve and allow fluid flow in the desired direction. Further, springs can fail due to wear, fatigue, or corrosion, ultimately causing the valve to function improperly or causing damage to the equipment into which the valve is installed.

Accordingly, other check valves have been developed in which the valve plates pivot to the closed position in response to fluid pressure from the undesired direction. In those fluid-actuated check valves, the valve plates typically comprise an elastomer hinge reinforced by metal discs. Because the elastomer hinge is very flexible, fluid pressure on the valve plates from fluid flow in the undesired direction forces the two D-shaped plates into the closed position, while fluid flow in the desired direction forces the valve plates to swing into the open position.

The flexibility of the elastomer hinge can create problems in fluid-actuated check valves when fluid pressure from fluid flow in the undesired direction is sufficiently strong that the valve plates are forced away from the base of the valve. This stretches the elastomer hinge and can cause the metal discs of the valve plates to slide off of the base. In this position, the metal discs can be caught against the side of the base, holding the valve plates in a partially open position. Further, the stretching of the elastomer hinge wears and fatigues it, creating an increasing probability that distortion of the hinge will cause the valve plates to fail to seal correctly against the tube or annular housing in the closed position. Repeated stretching of the elastomer hinge can ultimately lead to distortion or tears in the elastomer hinge, which may allow seepage of fluid past the valve or cause complete failure of the valve.

Another difficulty encountered in fluid-actuated dual plate check valves occurs when fluid pressure from fluid flow in the undesired direction pushes both valve plates to the same side of the base, closing off only one of the apertures. To address this problem, it is known to install a stop pin diametrically into the tube or annular housing in parallel with the base. The valve plates strike the stop pin and are prevented from rotating past a 90 degree vertical position with respect to the base. However, use of a diametrically extending stop pin requires either that the check valve incorporate an annular housing into which the pin is installed or that the stop pin be separately installed into the tube. Use of an annular housing adds to the complexity and expense of the valve and adds additional bulk which impedes fluid flow in the desired direction. Separate installation of the stop pin makes installation of the check valve more complex and requires that additional holes be made in the tube for the stop pin, which can create fluid leaks.

Accordingly, it is an object of the present invention to provide a fluid-actuated dual plate check valve wherein stretching of the elastomer hinge is substantially prevented.

It is a further object of the present invention to provide a dual plate check valve wherein displacement of both valve plates to one side of the valve is prevented without requiring the use of an annular housing for the valve or a separately installed stop pin.

It is a further object of the present invention to provide a fluid actuated dual plate check valve which can be used as a single point hookup for a temperature control device to heat or cool an automotive cooling system or other open or closed loop system.

Other objects and advantages of the current invention will become apparent when the inventive check valve is considered in conjunction with the accompanying drawings, specification and claims.

SUMMARY OF THE INVENTION

An inventive dual plate check valve is provided which comprises a central anchoring fixture having an upper surface and an elastomer hinge fixed to the central anchoring fixture by a center post clamp. Two opposing sections of the elastomer hinge are formed on opposing sides of the center post clamp, and at least one disc member is attached to each opposing section of the elastomer hinge to form a valve plate having a lower edge. Each valve plate is pivotable about the center post clamp into an open and a closed position.

In one embodiment, the central anchoring fixture forms at least one projection on opposing sides of the center post clamp such that the lower edges of the valve plates are prevented from sliding off of the upper surface of the central anchoring fixture. In another embodiment, each valve plate is associated with a side of the check valve in which the valve plate is positioned in its closed position. A stop pin is attached to the central anchoring fixture or center post clamp normal to the upper surface of the central anchoring fixture and extending between the valve plates such that each valve plate is prevented from pivoting beyond the stop pin.

BRIEF DESCRIPTION OF THE DRAWINGS

FIG. 1 is a side elevational view of a conventional pressure-actuated dual plate check valve installed in a tube wherein the valve plates are in the closed position and a stop pin is diametrically installed in the tube.

FIG. 2 is a side elevational view of the check valve of FIG. 1 wherein the valve plates are in the open position.

FIG. 3 is a side elevational view of the check valve of FIGS. 1 and 2 wherein the valve plates have become misaligned.

FIG. 4 is a side elevational view of the check valve of FIGS. 1–3 wherein no stop pin is used and both of the valve plates have been forced to the same side of the valve.

DESCRIPTION OF THE PREFERRED EMBODIMENT

Figure 5:
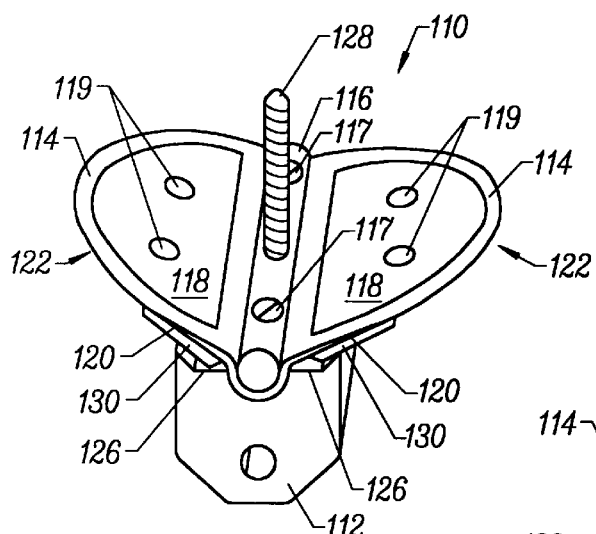
FIG. 5 is a perspective view of a preferred embodiment of the inventive pressure-actuated dual plate check valve.

FIGS. 1–4 depict a conventional pressure-actuated dual plate check valve 10. Valve 10 comprises a central anchoring fixture 12, and an elastomer hinge 14 fixed to the central anchoring fixture 12 by a center post clamp 16 secured by screws 17. Center post clamp 16 divides the elastomer hinge 14 into two opposing D-shaped sections. Inner and outer disc members 18 and 20, respectively, are fixed to each D-shaped section of the elastomer hinge 14 by fasteners such as screws or rivets 19, such that each D-shaped section of the elastomer hinge 14 together with its corresponding inner and outer disc members 18 and 20 forms a valve plate 22. Disc members 20 are frequently made with an angled, edged lower end 24 as shown most clearly in FIG. 2 which, when the valve plates 22 are in their closed position, is flush with the upper surface 26 of the central anchoring fixture 12, as shown most clearly in FIG. 1.

Valve 10 is directly installed inside a tube forming walls 50. The outer edges of the outer plates 20 are typically contoured to maximize the contact surface between the outer plates 20 and the tube walls 50 when the valve plates 22 are in the closed position. This helps to prevent the outer plates 20 from wearing a pocket (not shown) into the tube walls 50 from closure of the valve plates 22, which can cause the valve plates 22 to stick in the closed position. Each D-shaped section of the elastomer hinge 14 is slightly larger than disc members 18 and 20, allowing the elastomer material to seal the valve plates 22 with the tube walls 50.

As shown in FIG. 1, when valve 10 is functioning properly, fluid flow in the undesired direction F1 causes the valve plates 22 to rotate outwardly against the tube walls 50, closing off the apertures A formed on either side of the central anchoring fixture 12 between the fixture 12 and the tube walls 50. In this position, the bottom surfaces 24 of the outer disc members 20 should be aligned with the upper surface 26 of the central anchoring fixture 12. Referring to FIG. 2, fluid flow in the desired direction F2 causes the valve plates 22 to rotate inwardly, opening the apertures A and allowing fluid to flow through the valve.

However, FIG. 3 depicts how strong fluid pressure in the undesired direction F1 can pull the valve plates 22A and 22B into misalignment with the central anchoring fixture 12 by overstretching the elastomer hinge 14. The outer disc members 20 slide outwardly off of the upper surface 26 of the central anchoring fixture 12, and are pressed downwardly along its sides. As shown with valve plate 22A, in this position, the fluid pressure may still force the valve plate 22A outwardly into contact with tube walls 50. This will further stretch the elastomer hinge 14, particularly the portion 14A of the hinge between the center post clamp 16 and the lower edges of disc members 18 and 20. Alternatively, as shown with valve plate 22B, the outer disc member 20 may lock against the side of the central anchoring fixture 12, maintaining the valve plate 22B in a partially open position which allows fluid to pass through the valve in the undesired direction F1. In either case, the stretching of the hinge 14 as the lower edge of disc members 20 are pulled off of the upper surface 26 of the central anchoring fixture 12 causes wear and fatigue which may eventually break the hinge 14 or distort it such that the valve plate 22A will not form a uniform seal with tube wall 50.

Additionally, the sharp-edged lower end 24 of the outer disc member 20, if pressed inwardly against the elastomeric hinge 14, can cut or chafe against the hinge 14. Over time, this can damage the hinge 14 and prevent proper functioning of the valve 10.

In FIGS. 1–3, a stop pin 28 is shown as it would be installed into the tube, in parallel with the central anchoring fixture 12. FIG. 4 illustrates how, in the absence of stop pin 28, both valve plates 22 may close to the same side of the central anchoring fixture 12, closing aperture A1 but leaving aperture A2 open to fluid flow in the undesired direction F1. It should be noted that inclusion of the stop pin 28 does not prevent the misalignment of the valve plates 22 as shown in FIG. 3 because the stop pin 28 does not block either valve plate 22 from outward motion towards the tube walls 50.

Figure 6:
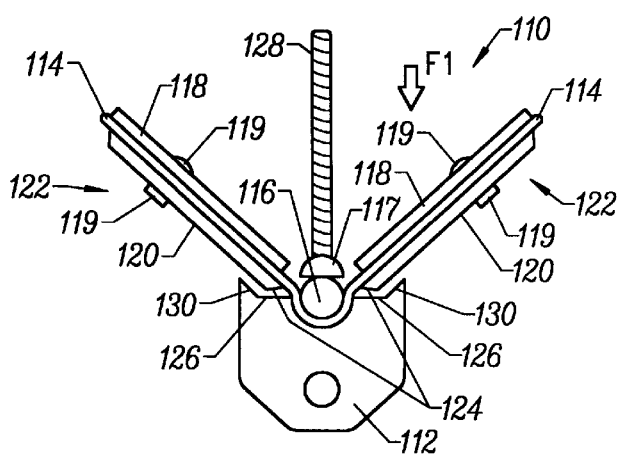
FIG. 6 is a side elevational view of the inventive check valve of FIG. 5 wherein the valve plates are in a closed position.
Figure 7:
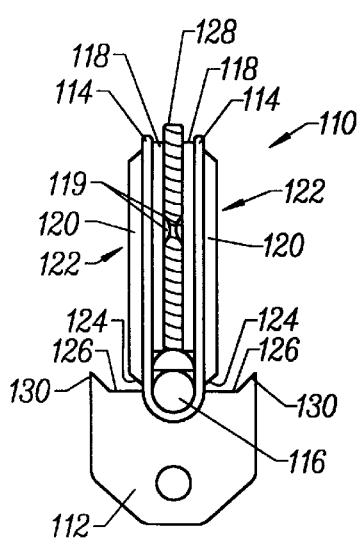
FIG. 7 is a side elevational view of the inventive check valve of FIGS. 5 and 6 wherein the valve plates are in an open position.
Figure 8:
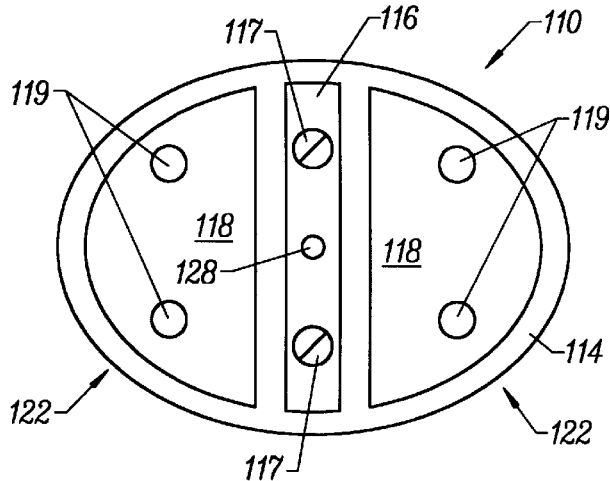
FIG. 8 is a top plan view of the inventive check valve of FIGS. 5–7 wherein the valve plates are in a closed position.

A preferred embodiment 110 of the inventive dual plate check valve is shown in FIGS. 5–9. Referring primarily to FIGS. 5–7, valve 110 preferably comprises a center anchoring fixture 112 to which an elastomer hinge 114 is fixed by a center post clamp 116. Clamp 116 is preferably secured to the fixture 112 by fasteners such as screws 117. Valve plates 122 are formed by securing inner and outer disc members 118 and 120 to the opposing sections of the elastomer hinge 114 with fasteners such as rivets 119. Outer disc members 120 preferably form fully radiused lower ends 124 which will not cut or abrade the elastomeric hinge 114 as the valve plates 122 move in response to fluid pressure.

Center anchoring fixture 112 incorporates projections 130 on either side of the center post clamp 116 which act to prevent the outer disc members 120 from slipping off the upper surface 126 in response to fluid pressure in the undesired direction F1. The width of the center anchoring fixture is preferably minimized to allow as much fluid flow through the valve 110 as possible when the valve plates are in the open position. Accordingly, projections 130 preferably define the outer edges of the upper surface 126 of the center anchoring fixture 112. However, it should be understood that if it is desired to widen the center anchoring fixture, projections 130 may be positioned inwardly from the outer edges of the upper surface 126.

As shown in FIG. 6, the lower edges 124 of the outer disc members 120 engage the projections 130 when the valve plates 122 are in the closed position, allowing rotational movement of the valve plates 122 to the closed position but preventing outward movement of the lower edges 124 and elastomer hinge 114 at the upper surface 126 of the center anchoring fixture 112. Accordingly, projections 130 prevent the elastomer hinge 114 from undesired stretching, and prevent the valve plates 122 from sliding over the sides of the center anchoring fixture 112 and locking into a partially open position.

Accordingly, inner and outer disc members 118 and 120 and elastomer hinge 114 can be made very thin and from lightweight materials without increasing the risk that the valve plates 122 will be pulled over the sides of the center anchoring fixture 112 due to their light weight. Consequently, valve 110 will be highly responsive to fluid flow in either the desired or undesired direction, as even very small degrees of fluid pressure will move the lightweight valve plates 122 between their closed and open positions.

Referring primarily to FIGS. 5–7, preferred valve 110 further comprises a stop pin 128 mounted such that it vertically extends between the valve plates 122 such that both valve plates 122 cannot pivot to the same side of the center post clamp 116. Stop pin 128 preferably is fitted into both center post clamp 116 and center anchoring fixture 112, as this both provides a secondary means of attachment between the clamp 116 and fixture 112 and strongly secures the stop pin 128 in the desired position. However, it should be understood that stop pin 128 could alternatively be attached only to the clamp 116 or only to the fixture 112, or could be made integrally with either the clamp 116 or fixture 112. Stop pin 128 is preferably oriented to be normal to the upper surface of the center anchoring fixture 112, thereby preventing rotation of either valve plate 122 past the center line of the center anchoring fixture 112, but it should be understood that any orientation of the stop pin 128 may be used which prevents both valve plates 122 from moving into a position wherein the valve plate 122 will remain in an open position in response to fluid flow in the undesired direction F1.

Figure 9:
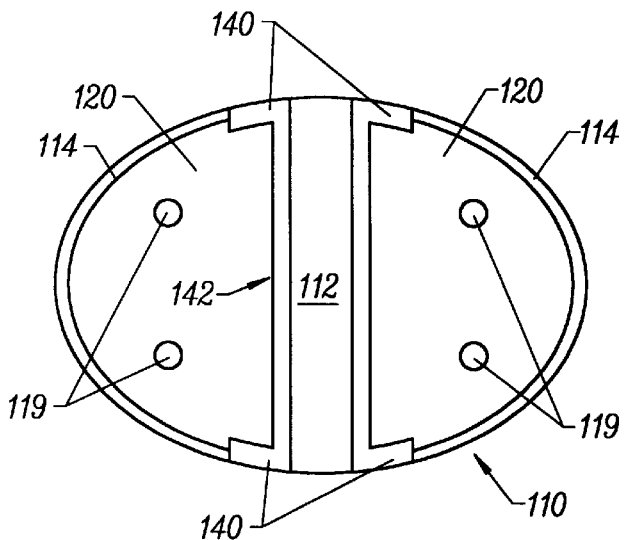
FIG. 9 is a bottom plan view of the inventive check valve of FIGS. 5–8 wherein the valve plates are in a closed position.
Figure 9A:
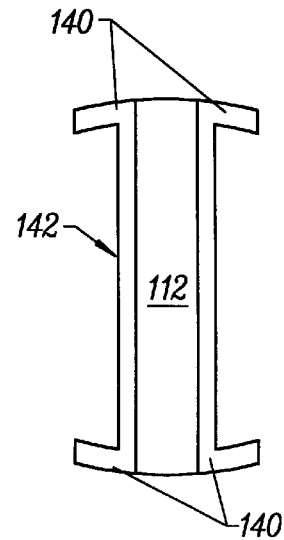
FIG. 9A is a bottom plan view of the inventive check valve of FIGS. 5–8 wherein the valve plates are in an open position.
Figure 10:
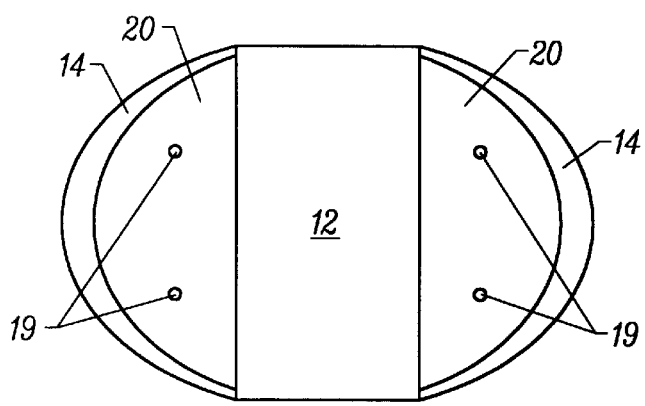
FIG. 10 is a bottom plan view of the conventional check valve of FIGS. 1–4 wherein the valve plates are in a closed position.
Figure 10A:
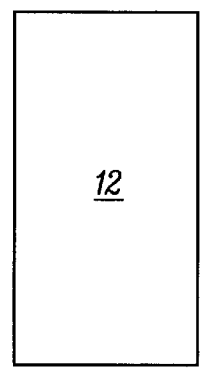
FIG. 10A is a bottom plan view of the conventional check valve of FIGS. 1–4 wherein the valve plates are in an open position.

The central anchoring fixture 112 is preferably made as narrow as possible at every point to maximize the cross-sectional area through which fluid may pass the valve in the desired direction. Accordingly, referring to FIGS. 9 and 9A, which illustrate bottom plan views of the inventive check valve 110 with the valve plates 122 closed and open, respectively, and to FIG. 11, which illustrates a perspective view of the central anchoring fixture 112 isolated from the other portions of valve 110, central anchoring fixture 112 forms lips 140 at its outer edges which are wider than the central shaft 142 of the fixture 112. Shelves 144 (see FIG. 11) are made sufficiently wide to support the lower edges 124 of the valve plates 122 (see FIGS. 5–7) when the plates 122 are in the closed position, while lips 140 (see FIGS. 9, 9A and 11) are made sufficiently wide to incorporate projections 130 (see FIG. 11) which prevent valve plates 122 from sliding off of shelves 144. Thus, the central shaft 142 is kept only as wide as is necessary to support the center post clamp 116 (see FIGS. 5–7) and the lower edges of the valve plates 122. In contrast, as shown in FIGS. 10 and 10A, conventional check valves 10 have typically used a wider central anchoring fixture 12 to accommodate thicker disc members 20.

Figure 11:
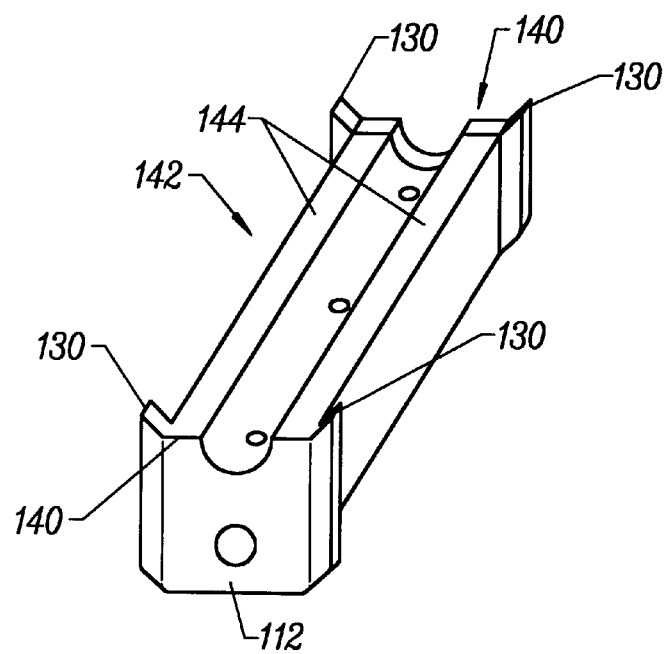
FIG. 11 is a perspective view of the central anchoring fixture of the inventive check valve.

Accordingly, referring to FIG. 11, in preferred embodiment 110, projections 130 do not extend along the full length of the central anchoring fixture 112, but instead are formed only at its outer edges. However, if a wider central shaft 142 is used, it should be understood that the projections 130 may extend across the full length of the central anchoring fixture 112.

It should be understood that a variety of materials can be used in constructing the inventive check valve 110. For example, the center anchoring fixture 112, center post clamp 116, stop post 128, screws 117 and rivets 119, and inner and outer disc members 118 and 120 may be made from materials including but not limited to metals or plastics. The elastomer hinge 114 may be made from any flexible durable material, including but not limited to rubber or a composite thereof.

It should be further understood that the valve plates of the inventive check valve may be formed in different sizes and shapes for installation into tubes or pipes of different contours and dimensions.

Figure 12:
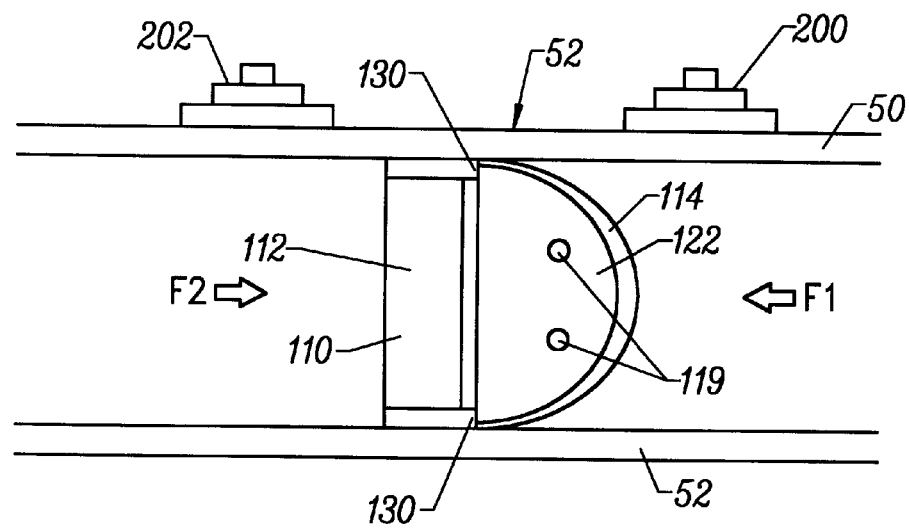
FIG. 12 is a side elevational view of the inventive check valve of FIGS. 5–9 installed within a tube of an automotive cooling system.

While the inventive valve 110 can be used in a variety of applications, the inventive valve is well suited for use in an automotive cooling system to provide a single point hookup for a temperature control device to heat the coolant flowing through the automotive cooling system to warm the automobile's engine or to cool the coolant to cool the automotive cooling system. For example, referring to FIG. 12, the valve 110 may be installed into a tube 52 in the automotive cooling system (having tube walls 50), and dry break fittings 200 and 202 positioned on the tube on either side of the valve. For purposes of the discussion below, it shall be assumed that the temperature control device is used to introduce heated coolant into the automotive cooling system. When the temperature control device (not shown) is not connected to the automotive cooling system, coolant in the system passes freely in the desired direction F2 past valve 110. However, when the temperature control device is connected to the system, a conduit bearing heated coolant from the temperature control device is attached to dry break fitting 200 and a conduit returning coolant to the temperature control device is attached to dry break fitting 202. Because the heated coolant is introduced into the automotive cooling system on the downstream side of the valve, fluid pressure from the introduced coolant towards the upstream dry break fitting 202 causes the valve 110 to close and prevent the coolant from immediately exiting the system. Accordingly, the heated coolant is forced to travel in the desired direction F2 to make a complete loop through the automotive cooling system, heating the entire automotive cooling system evenly over a short duration. Depending upon the temperature rating of the components used to make the valve 110, valve 110 can be used with fluids having a wide range of temperatures. It is anticipated that valve 110 will operate, at a minimum, within temperatures in the range of between negative 65 degrees Fahrenheit and positive 400 degrees Fahrenheit (−65° F. through 400° F.).

Although the foregoing invention has been described in some detail by way of illustration for purposes of clarity of understanding, it will be readily apparent to those of ordinary skill in the art in light of the teachings of this invention that certain changes and modifications may be made thereto without departing from the spirit or scope of the appended claims.

It is claimed:

1. A dual plate check valve, comprising:

a central anchoring fixture having an upper surface;

an elastomer hinge, said elastomer hinge fixed to said central anchoring fixture by a center post clamp such that two opposing sections of said elastomer hinge are formed on opposing sides of said center post clamp, at least one disc member attached to each said opposing section of said elastomer hinge to form a valve plate having a lower edge, said valve plates each pivotable about said center post clamp into an open and a closed position;

said central anchoring fixture forming at least one projection on each side of said center post clamp such that said lower edges of said valve plates are prevented from sliding off of said upper surface of said central anchoring fixture.

2. The check valve of claim 1 wherein said projections are formed at an outer edge of the upper surface of said central anchoring fixture.

3. The check valve of claim 2 wherein each of said projections extends only partially along the outer edge of the upper surface of said central anchoring fixture on which it is formed.

4. The check valve of claim 2 wherein each of said projections extends along the entirety of the outer edge of the upper surface of said central anchoring fixture on which it is formed.

5. The check valve of claim 2 wherein two disc members are attached to each opposing section of said elastomer hinge to form said valve plates.

6. The check valve of claim 5 wherein said valve plates are substantially D-shaped.

7. The check valve of claim 1 further comprising a stop pin attached to said central anchoring fixture or center post clamp normal to said upper surface of said central anchoring fixture and extending between said valve plates, said stop pin preventing each valve plate from pivoting beyond said stop pin.

8. A dual plate check valve, comprising:

a central anchoring fixture having an upper surface;

an elastomer hinge, said elastomer hinge fixed to said central anchoring fixture by a center post clamp such that two opposing sections of said elastomer hinge are formed on opposing sides of said center post clamp, at least one disc member attached to each said opposing section of said elastomer hinge to form a valve plate, said valve plates each pivotable about said center post clamp into an open and a closed position;

a stop pin attached to said central anchoring fixture or center post clamp normal to said upper surface of said central anchoring fixture and extending between said valve plates, said stop pin preventing each valve plate from pivoting beyond said stop pin.

9. The check valve of claim 8 wherein two disc members are attached to each opposing section of said elastomer hinge to form said valve plates.

10. The check valve of claim 9 wherein said valve plates are substantially D-shaped.

* * * * *